United States Patent [19]
Platt

[11] Patent Number: 5,788,224
[45] Date of Patent: Aug. 4, 1998

[54] FENCE RAIL CLIP

[76] Inventor: Robert E. Platt, 8701 Highland Ave., Mineral Ridge, Ohio 44440

[21] Appl. No.: 717,656

[22] Filed: Sep. 16, 1996

[51] Int. Cl.[6] .................................................. E04H 17/14
[52] U.S. Cl. ........................... 256/66; 256/19; 256/59; 256/65; 256/66; 403/263; 403/331; 52/656.9
[58] Field of Search .................... 403/244, 253, 403/263, 375, 331, 374; 256/19, 59, 65, 66, 70; 52/656.9, 656.1, 712

[56] References Cited

U.S. PATENT DOCUMENTS

| | | | |
|---|---|---|---|
| 1,258,460 | 3/1918 | Rees | 256/66 |
| 2,886,278 | 5/1959 | Opie | 256/65 X |
| 2,904,314 | 9/1959 | Thom | 256/65 |
| 3,051,426 | 8/1962 | Wagner | 256/65 X |
| 4,835,852 | 6/1989 | Asplund et al. | 256/65 X |
| 4,929,116 | 5/1990 | Mahl | 403/263 |
| 5,083,331 | 1/1992 | Schnelle et al. | 403/331 X |
| 5,244,300 | 9/1993 | Perreira et al. | 403/263 X |
| 5,544,865 | 8/1996 | Abbaticchio | 256/65 X |
| 5,544,866 | 8/1996 | Dye | 256/59 X |

*Primary Examiner*—Daniel P. Stodola
*Assistant Examiner*—Bruce A. Lev
*Attorney, Agent, or Firm*—Sand & Sebolt

[57] ABSTRACT

A fence rail clip attaches a fence rail perpendicularly to a fence post and includes a oval-shaped base which mounts to the fence post and a locking bracket which receives an end of the fence rail and interlocks with the base. The base has a tapered edge which is angled inwardly from front to rear and two counter bored holes formed therein for receiving a pair of screws. The locking bracket has a generally U-shaped panel with an outwardly extending peripheral wall, and has a similar shape to that of the cross-sectional shape of the fence rail. A channel is formed between a pair of spaced legs of the U-shaped panel and includes a narrow bottle-neck section formed between an oval-shaped section which is complementary in shape to a rear of the base and an outwardly angled bottom section which guides the bracket over the base. An outer edge of the channel is tapered inwardly from a front to a rear of the locking bracket in a complementary relationship to the tapered edge of the base. A curved slotted opening is formed in each leg adjacent the bottle-neck section to allow the an inner edge of the channel to flex outwardly around the openings when the base extends through the channel. A plurality of tabs extend from the panel and form a gap between the panel and the end of the fence rail.

19 Claims, 8 Drawing Sheets

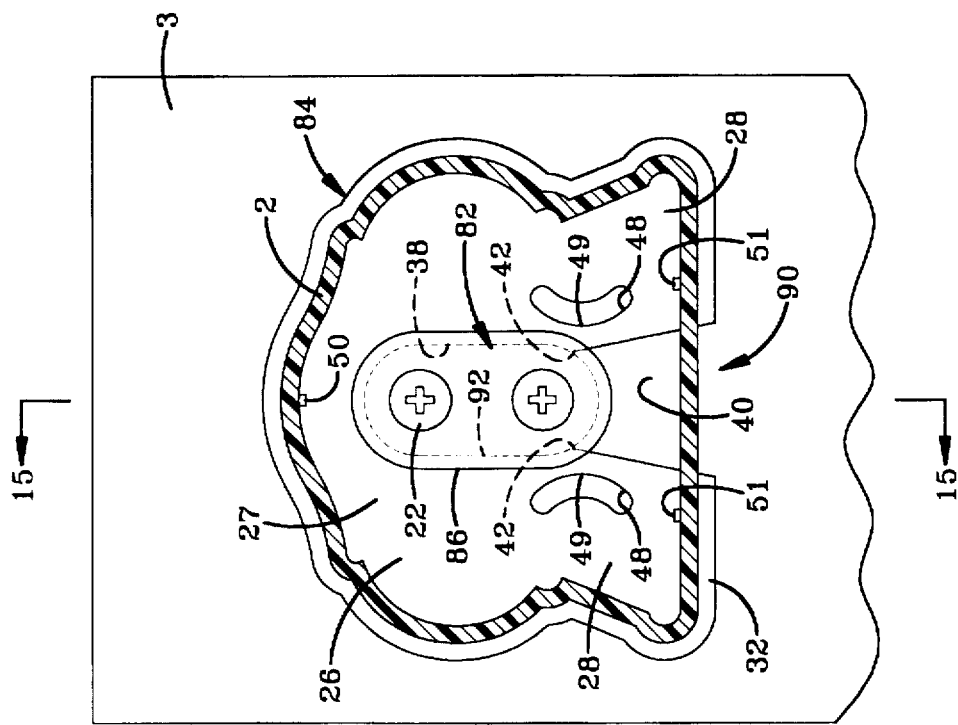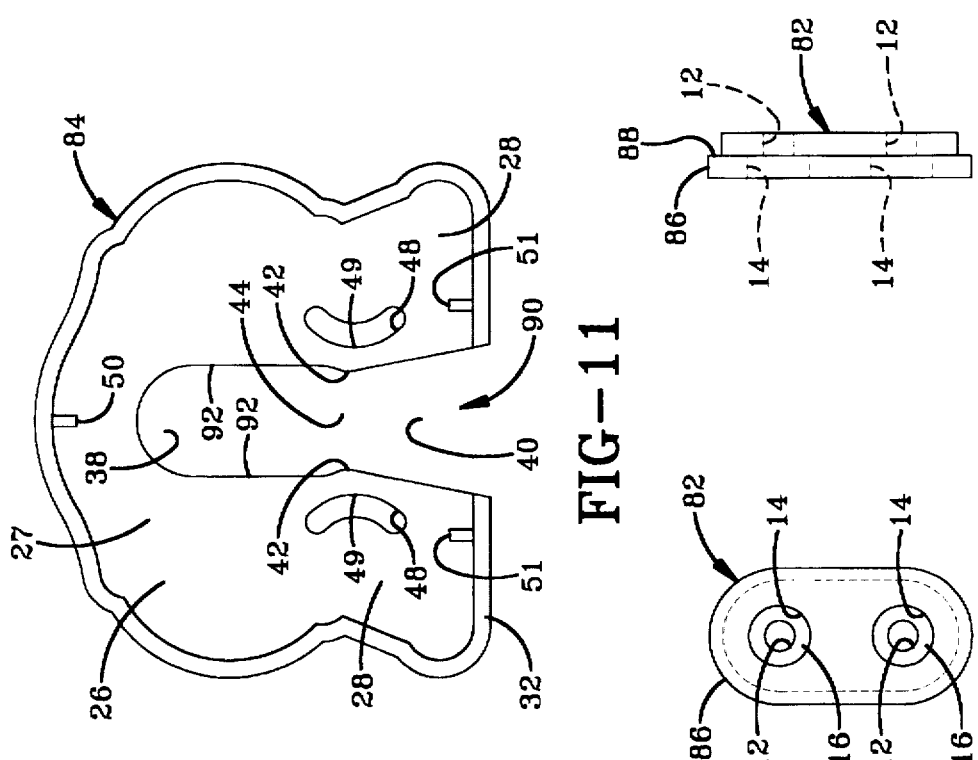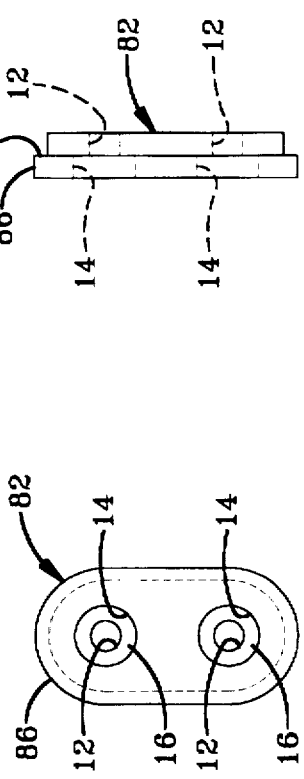

FENCE RAIL CLIP

BACKGROUND OF THE INVENTION

1. Technical Field

Generally, the invention relates to clips. More particularly, the invention relates to a fence rail clip which fasten a fence rail to a fence post. Specifically, the invention relates to such a clip with a base mounted to the fence post and a locking bracket which extends over an end of the fence rail and interlocks with the base to attach the fence rail to the fence post.

2. Background Information

In England, the use of fences dates from the 12th century and accompanied the breakdown of the manorial system. The development of fences continued through the 14th century with the rapid expansion of the Flemish wool trade and the resulting monetary advantages of fenced sheep pastures. Inclosure with fences reached its peak in the 17th century, and although it was hard on the small farmer, it produced more efficient farming.

Fences are used in today's society for a variety of reasons and are available in a variety of different styles and types. For example, farmers use fences to contain their livestock, to prohibit entry of predators and to protect their crops. Businesses use fences to keep thieves and trespassers off of their premises. Residents use fences to keep their children and pets within their property limits or for aesthetic and ornamental purposes.

Conventionally, these residential fences were constructed of wood, rock or wire, each of which has its disadvantages. Wood fences frequently need painting and rot over time. Also, wooden fences are assembled by forming a slot in the vertical fence post through which a slatted end of the fence rail extends to mount the fence rail to the post. These slots allow water to enter and sit therein subjecting the fence posts to water damage and rotting. Further, wooden rails are heavy and difficult to assemble. Rock fences are difficult to construct and are dangerous if the heavy fence wall begins to crumble. Wire fences rust making them unpleasing to the eye and are impractical for residential use.

Alternatives to conventional fences are plastic or vinyl fences. Vinyl fences are aesthetically pleasing, are easy to install and never rot or need painting. The problem with vinyl and plastic fence is that it is difficult to connect the horizontally extending fence rails to the vertically extending fence posts.

Therefore, the need exists for an improved fence rail clip for retaining horizontal fence rails to vertical fence posts.

SUMMARY OF THE INVENTION

Objectives of the invention include providing an improved fence rail clip to perpendicularly attach a fence rail to a fence post.

A further objective of the invention is to provide an improved fence rail clip which securely retains a fence rail adjacent a fence post which is simple to install, and which permits a fence rail to be removed from intermediate adjacent fence posts as desired.

Another objective of the invention is to provide such a clip in which a peripheral outer edge of the base and the fence post form a gap therebetween; and in which the locking bracket has a snap channel formed therein which receives the base and snap-fits within the gap.

A further objective of the invention is to provide such a clip in which the channel has a narrow bottle-neck section formed between two inwardly extending elbows; and in which a pair of slotted openings are formed adjacent the elbows to allow the elbows to deflect outwardly when the base passes through the bottle-neck section.

Still a further objective is to provide such a clip which is a two piece member molded of a plastic and is sturdy enough to hold the fence rail to the fence post yet is resilient enough to allow the elbows of the locking bracket to flex outwardly when the base passes therebetween and to snap partially around a curved end of the base to retain the base within the snap channel.

Another objective is to provide such a clip in which the locking bracket can be molded in various configurations to correspond to various styles of fence rails; and which is easily installed by merely screwing the base to the fence post, inserting the end of the fence rail into the locking bracket and sliding the locking bracket over the base.

Still another objective of the invention is to provide such a clip which may be quickly installed with very simple tools.

Another objective is to provide such a clip which is of simple construction, which achieves the stated objectives in a simple, effective and inexpensive manner, and which solves problems and satisfies needs existing in the art.

These objectives and advantages are obtained by the improved fence rail clip of the present invention, the general nature of which may be stated as including a base having a front surface and a rear surface; attachment means for attaching the base to the fence post; a bracket having a front surface, a rear surface and a fence rail receptacle complementary shaped to the fence rail formed in the bracket and adapted for receiving an end of the fence rail; and attachment means for attaching the bracket to the base when the fence rail is received within the fence rail receptacle.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 11 is a front elevational view showing the locking bracket of a second embodiment of the clip of the present invention;

3

Figure 8:
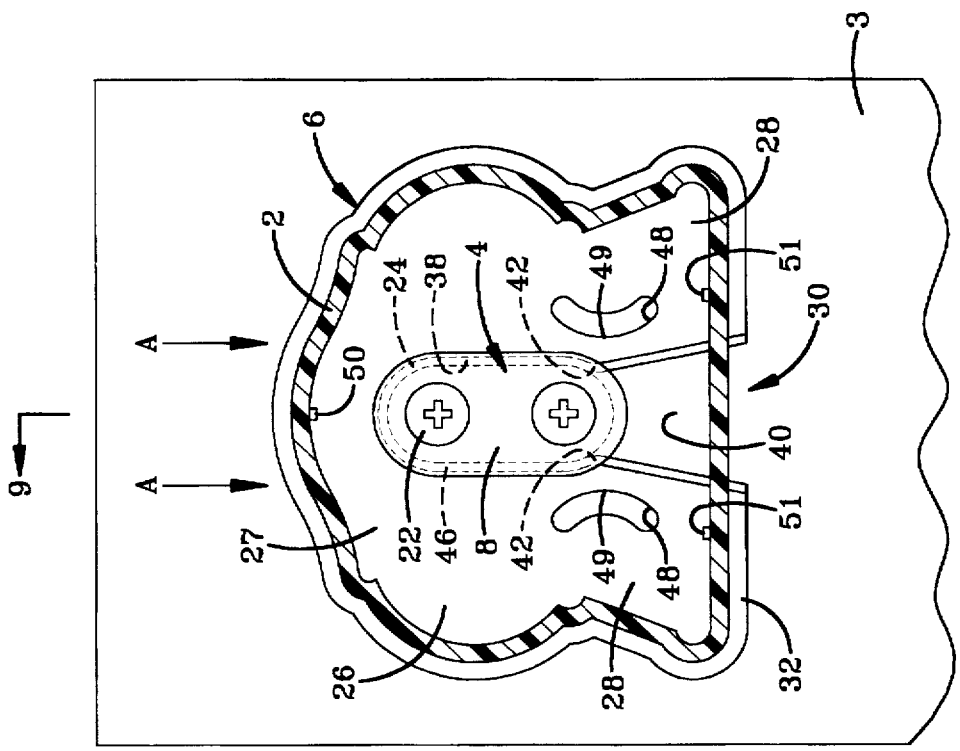
FIG. 8 is an elevational view similar to FIG. 7 showing the locking bracket fully assembled with the base.
Figure 15:
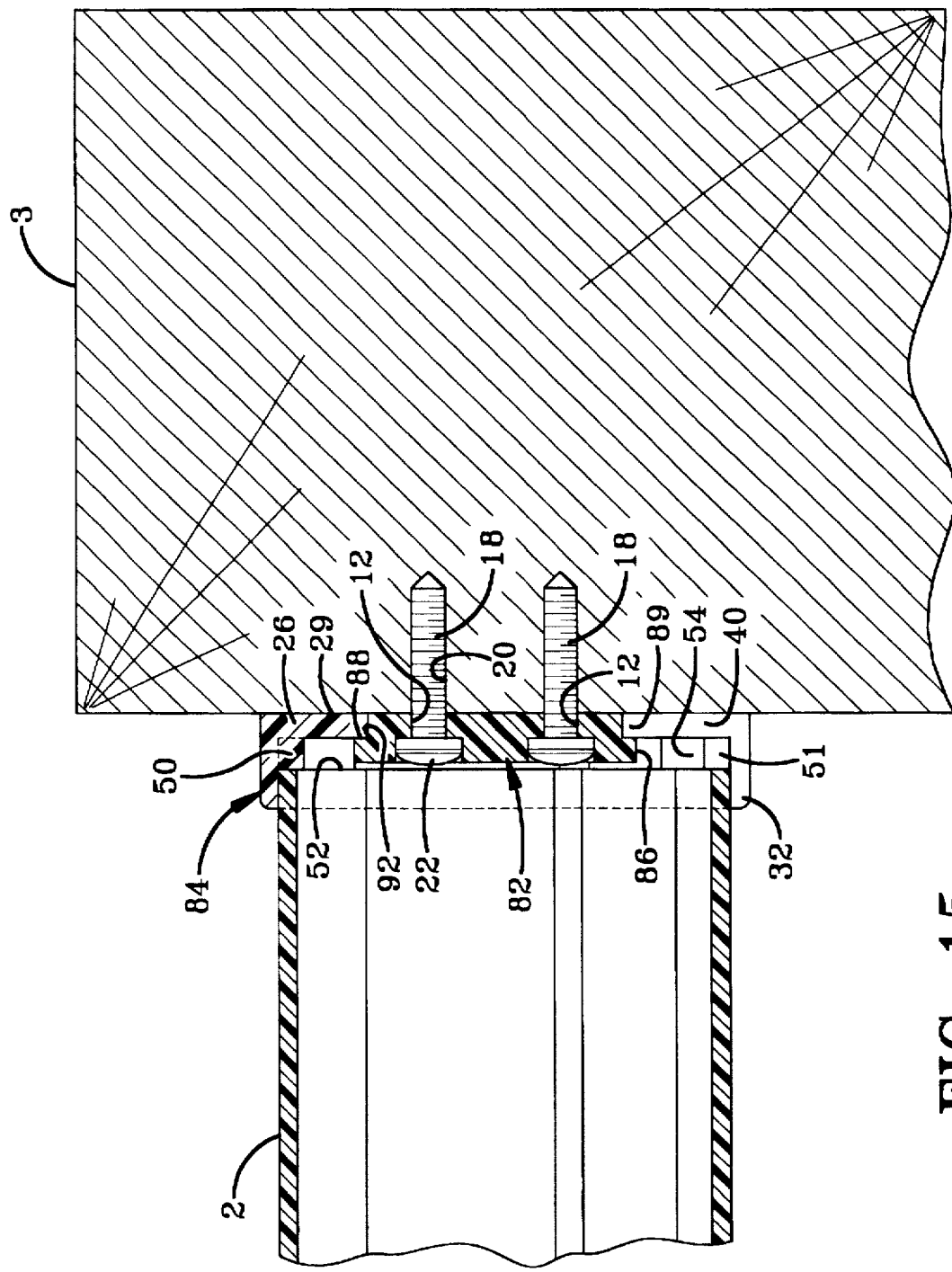

FIG. 12 is a front elevational view showing the base of the second embodiment of the clip;

FIG. 13 is a side elevational view of the base of FIG. 12;

FIG. 14 is an elevational view similar to FIG. 8 of the second embodiment of the clip; and FIG. 15 is a sectional view taken along line 15—15, FIG. 14.

Similar numerals refer to similar parts throughout the drawings.

DESCRIPTION OF THE PREFERRED EMBODIMENTS

Figure 1:
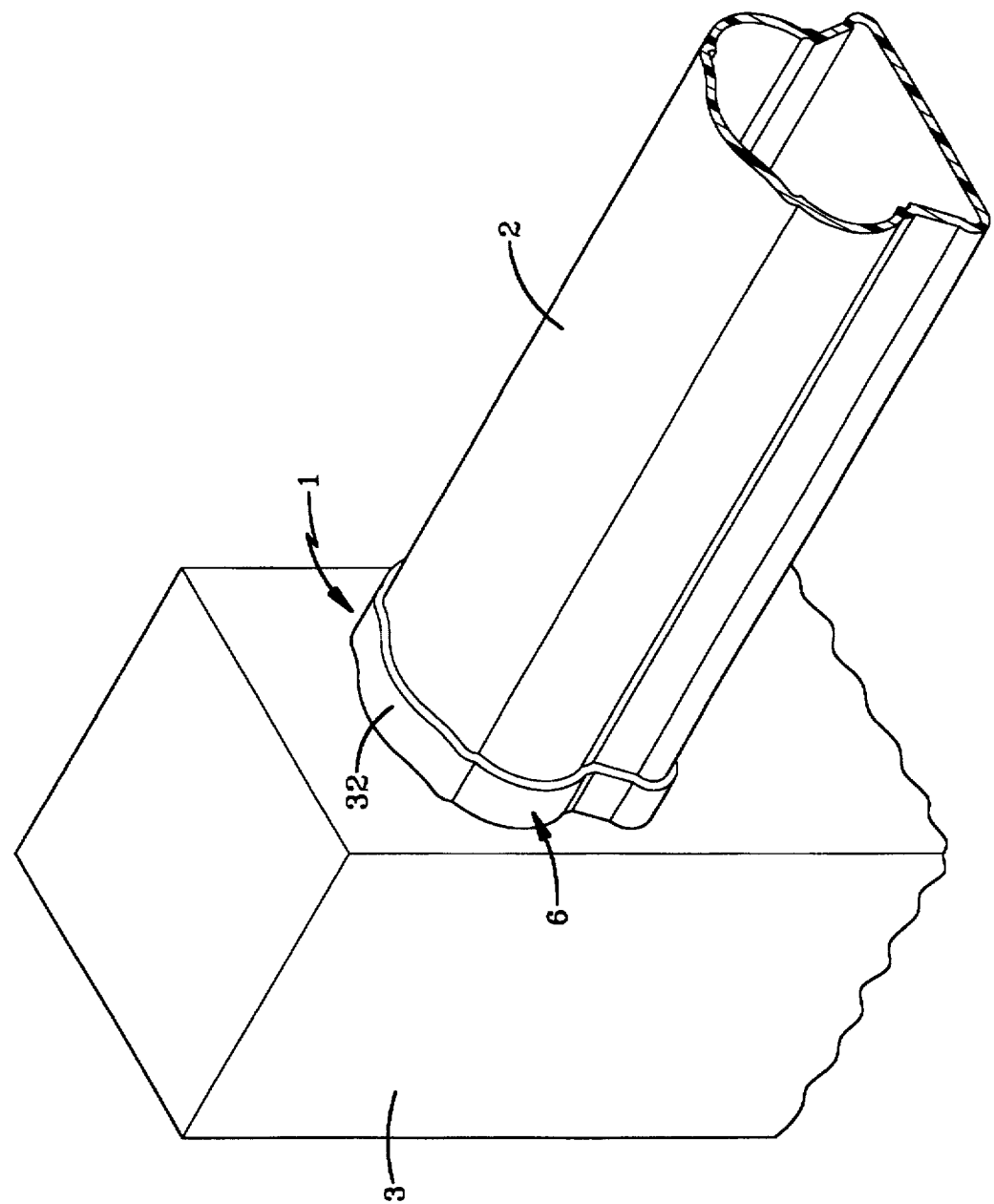
FIG. 1 is a fragmentary perspective view of the fence rail clip of the present invention shown attaching a fence rail to a fence post.
Figure 2:
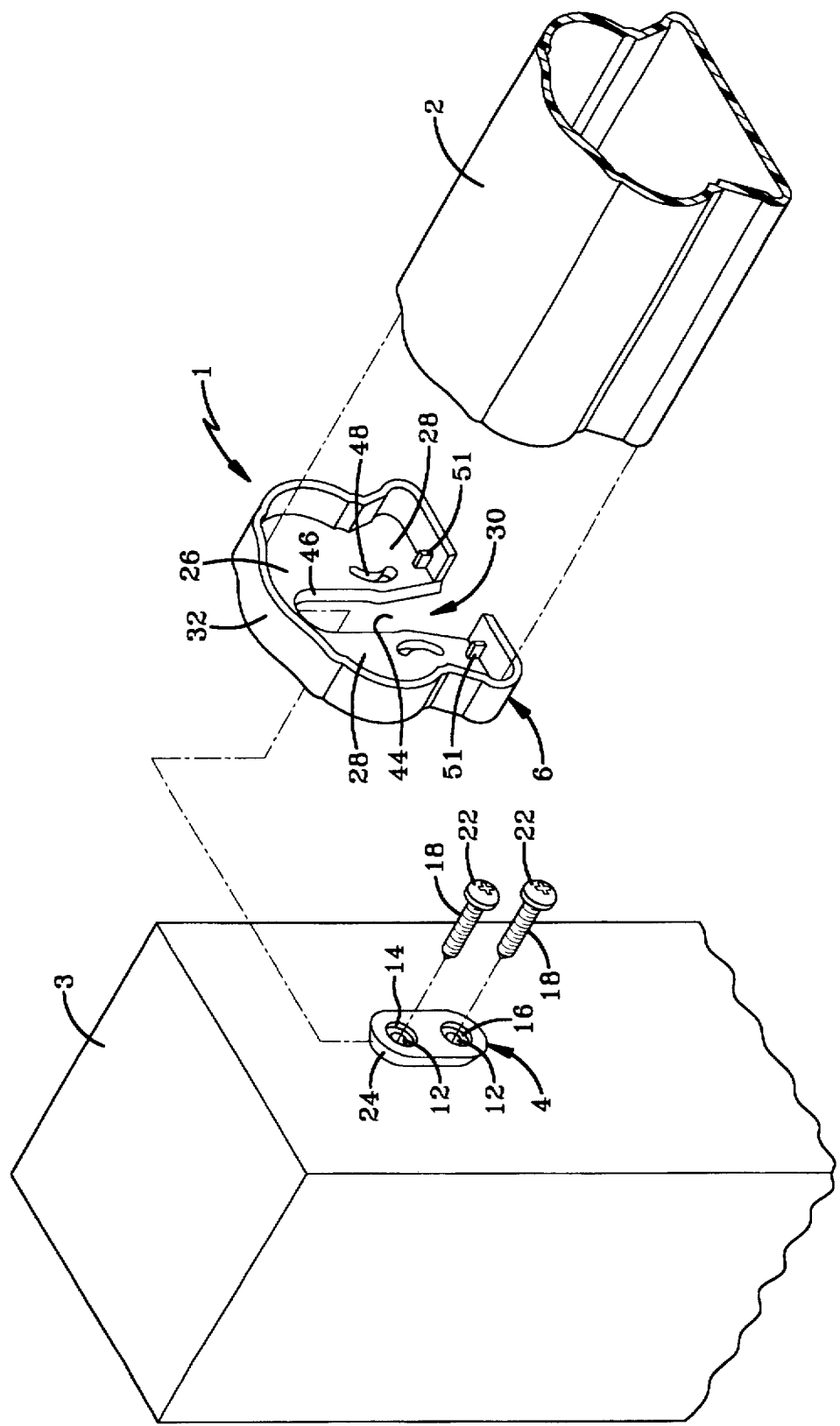
FIG. 2 is an exploded fragmentary perspective view similar to FIG. 1.
Figure 3:
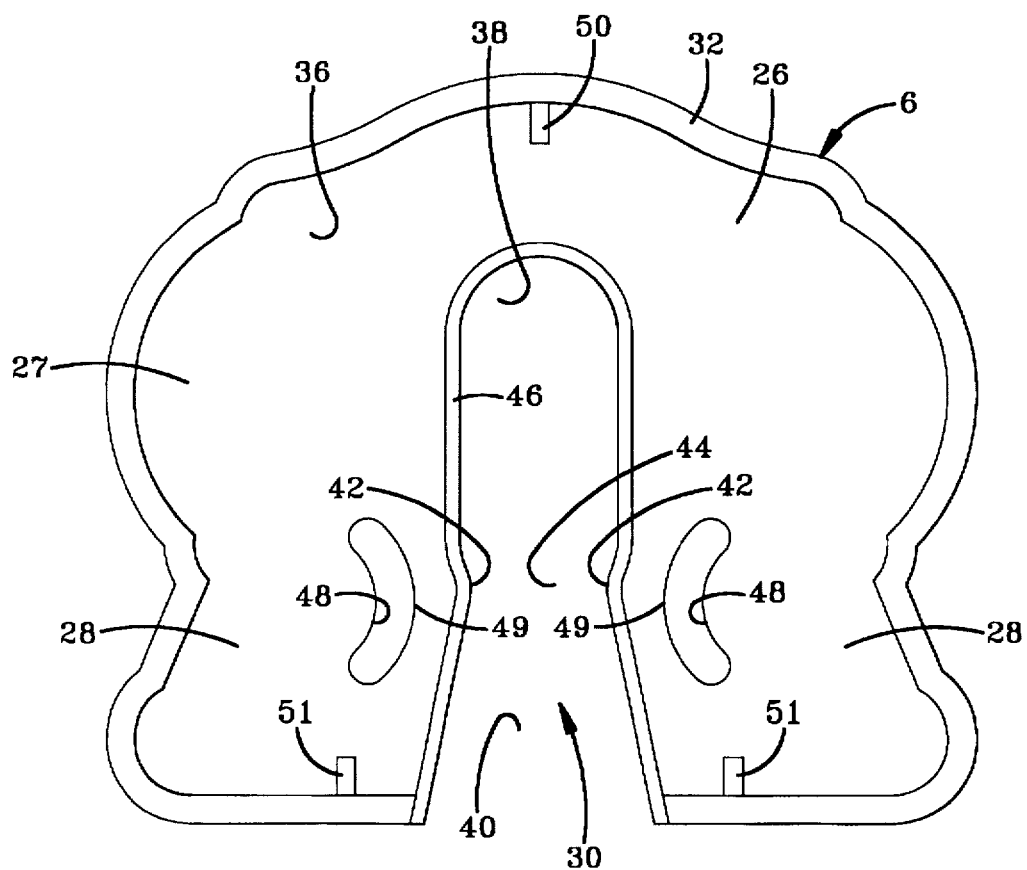
FIG. 3 is a front elevational view of the locking bracket of the clip of FIG. 2.

The fence rail clip of the present invention is indicated generally at 1 and is shown in FIG. 1 attaching a fence rail 2 to a fence post 3. Fence rail 2 is preferably a hollow member molded of a plastic or vinyl and is shown in FIGS. 1 and 2 in one of various shapes and styles, and fence post 3 is preferably a wooden rectangular-shaped post which extends upwardly from the ground (FIGS. 1 and 2). Clip 1 is a two-piece member (FIG. 2) preferably molded of a resilient plastic material and includes a base, indicated generally at 4 (FIG. 2), and a locking bracket indicated generally at 6 (FIGS. 1–3 and 6–9).

Figure 4:
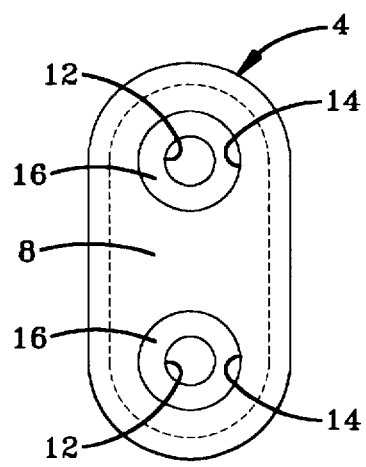
FIG. 4 is a front elevational view of the base of the clip of FIG. 2.
Figure 5:
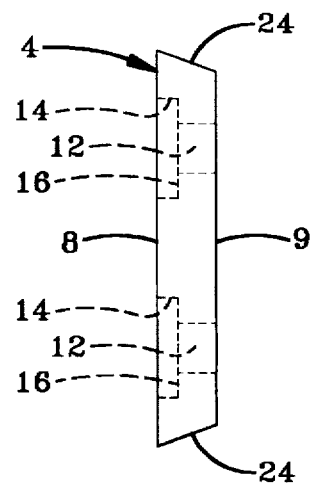
FIG. 5 is a side elevational view of the base of FIG. 4.
Figure 9:
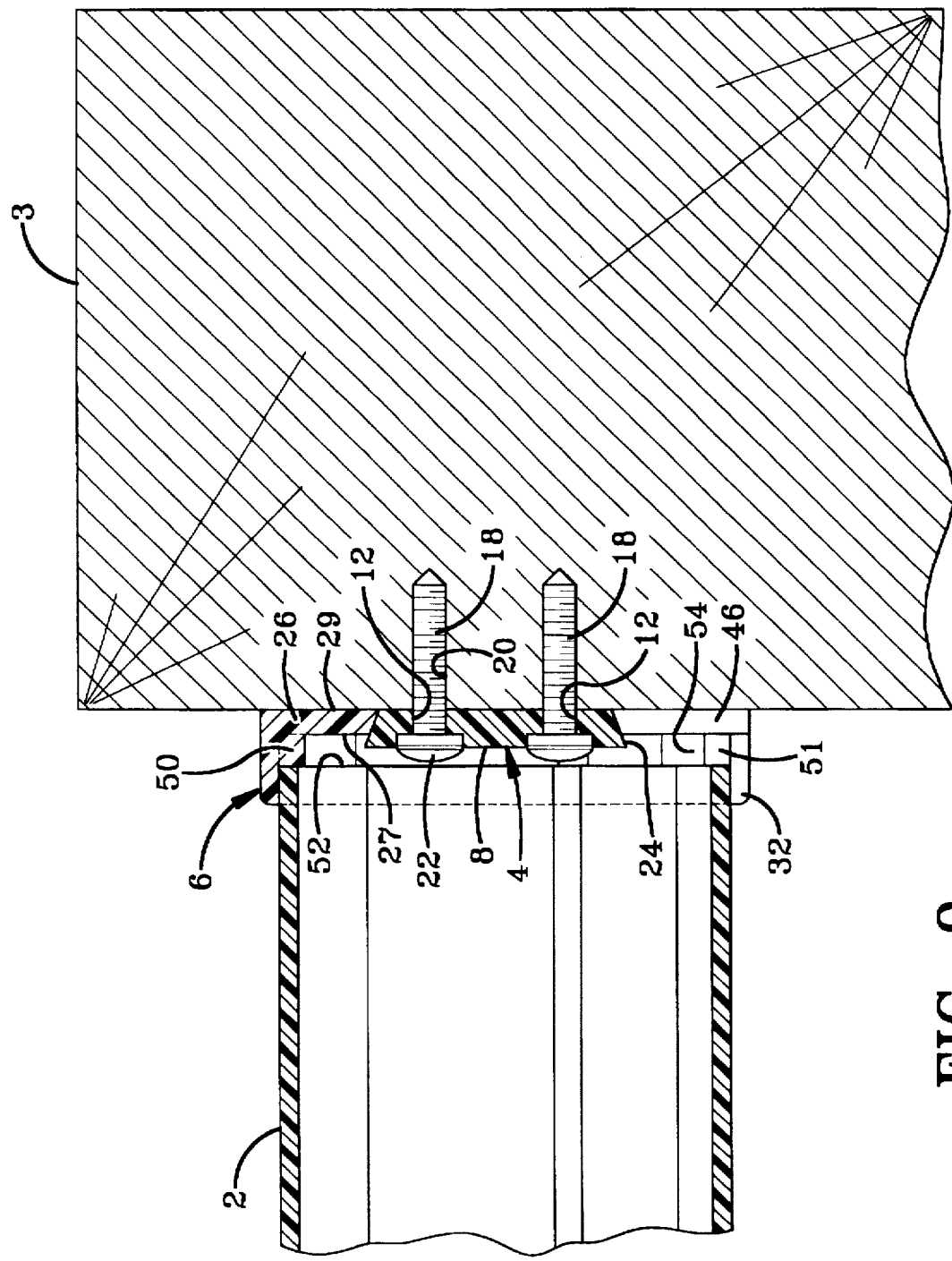
FIG. 9 is a sectional view taken along line 9—9, FIG. 8.

Base 4, shown particularly in FIGS. 4 and 5, is preferably oval-shaped and has front and rear surfaces 8 and 9, respectively. A pair of circular holes 12 is formed through base 4 with each hole 12 having an enlarged counterbore 14 formed in front surface 8 and forming a stepped shoulder 16. A pair of screws 18 (FIGS. 2 and 9) extend through holes 12 and into a pair of holes 20 drilled in fence post 3 and axially aligned with holes 12. Screws 18 include a screw head 22 which sits within counterbore 14 and abuts stepped shoulder 16 when base 4 is mounted on fence post 3, as described below. A peripheral outer edge 24 of base 4 is tapered inwardly from front surface 8 to rear surface 9 (FIG. 5) such that rear surface 9 is smaller than front surface 8 thereby forming a recessed portion. Smaller rear surface 9 abuts fence post 3 when base 4 is mounted thereon (FIG. 9).

Locking bracket 6 includes a flat generally U-shaped panel 26 having a front surface 27 and a rear surface 29, (FIGS. 2–3) and a pair of spaced legs 28 which form a snap channel 30 at one end of bracket 6 between legs 28 for slidably receiving base 4 as described below, and a peripheral wall 32 (FIGS. 2, 3 and 6–9) which extends outwardly from front surface 27 of panel 26 and forms a fence rail receptacle 36 with panel 26. Snap channel 30 has an inner substantially oval-shaped section 38 sized to receive base 4 as described below, and an outwardly angled section 40. An elbow 42 extends from each leg 28 at the junction of sections 38 and 40 forming a bottle-neck section 44 therebetween which is slightly narrower than oval shaped section 38 and base 4. Snap channel 30 has a chamfered edge 46 which is tapered inwardly from front surface 27 toward rear surface 29 such that snap channel 30 is larger adjacent front surface 27 than rear surface 29 forming an extended portion. Additionally, chamfered edge 46 is complementary related to peripheral outer edge 24 of base 4.

In accordance with one of the features of the invention, a kidney-shaped slotted opening 48 is formed in each leg 28 adjacent elbows 42. The ends of each U-shaped opening 48 extend outwardly away from elbows 42 and a center portion 49 of openings 48 align with elbows 42 and allow the elbows to flex inwardly when locking bracket 6 interlocks with base 4.

An upper tab 50 extends outwardly from front surface 27 of panel 26 and is located centrally along the top inner surface of wall 32. A lower tab 51 extends outwardly from surface 27 and is located along the bottom inner surface of wall 32 of each leg 28. Tabs 50 and 51 prevent an end 52 of rail 2 from abutting panel 26 and form a gap 54 therebetween (FIG. 9).

In accordance with a further feature of the invention, locking bracket 6 is similar in shape to the cross-sectional configuration of fence rail 2 to allow the end of rail 2 to fit securely within rail receptacle 36. FIGS. 1, 2 and 6–9 show specific rail style well known in the art, but it should be understood that locking bracket 6 and fence rail 2 could be any shape or style without affecting the concept of the invention.

In use, a fence installer forms holes 20 (FIG. 9) in fence post 3 to axially align with holes 12 of base 4. The installer positions rear surface 9 of base 4 against fence post 3 and aligns holes 12 with holes 20, to assure that outer edge 24 of base 4 extends angularly outwardly from fence post 3. The installer inserts screws 18 through holes 12 and 20 and tightens the screws until screw heads 22 abut stepped shoulders 16 and each screw head 22 sits within its respective counterbore 14 to firmly secure base 4 to post 3.

Then, the installer inserts fence rail 2 into fence rail receptacle 36 of locking bracket 6 until end 52 of rail 2 abuts tabs 50 and 51. When end 52 is positioned within receptacle 36, peripheral wall 32 extends around the perimeter of rail 2 and prevents substantial side-to-side and up-and-down movement of rail 2. Tabs 50 and 51 form gap 54 between end 52 of rail 2 and panel 26 to allow base 4 and screw heads 22 to pass therebetween (FIG. 6) as described below.

Figure 7:
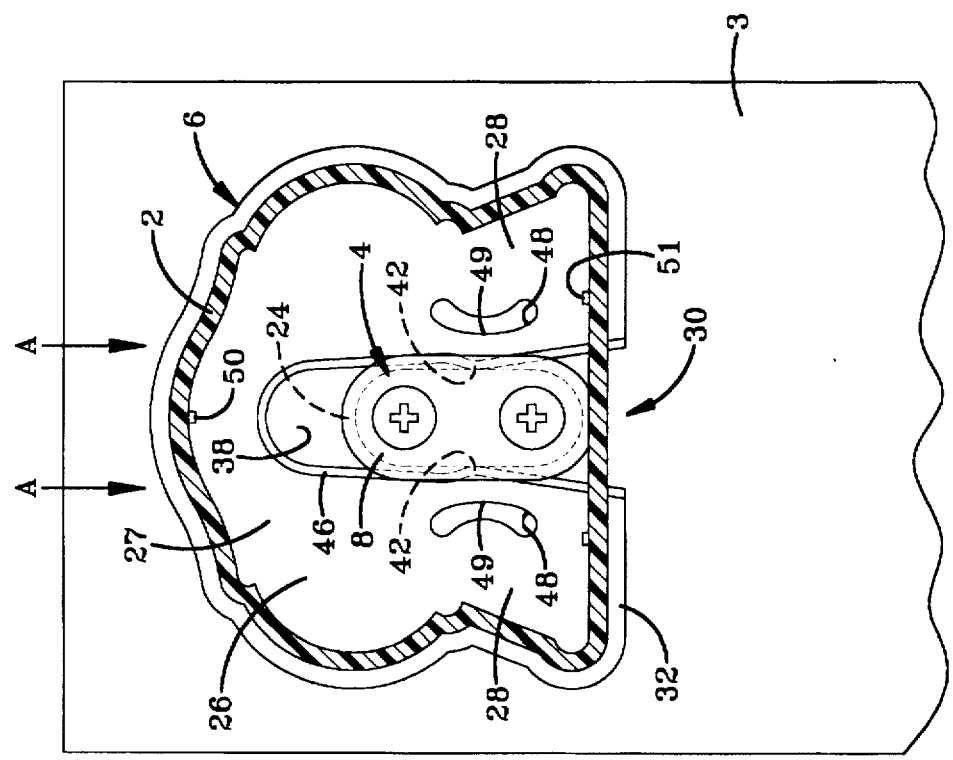
FIG. 7 is an elevational view similar to FIG. 6 showing the locking bracket partially assembled with the base.
Figure 6:
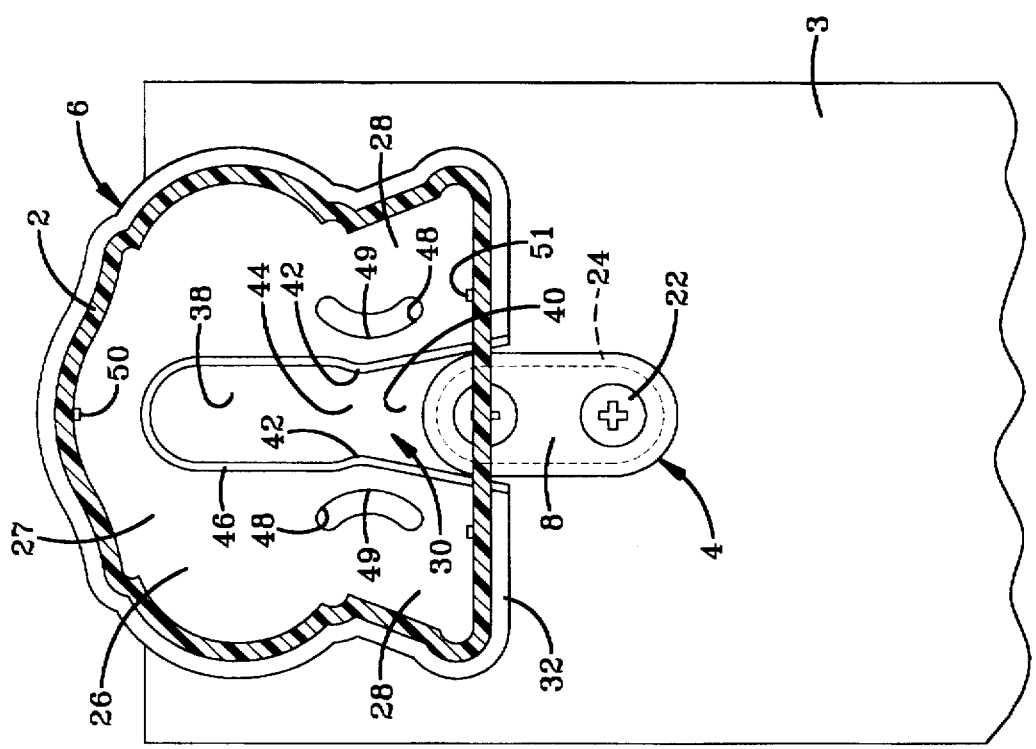
FIG. 6 is an elevational view of the clip of FIG. 2 prior to assembly and showing the fence rail in section and the fence post in fragmentary.

The installer positions the rear surface of locking bracket 6 against fence post 3 above base 4 and snap-fits or operatively interlocks locking bracket 6 to base 4 by sliding bracket 6, with fence rail 3 positioned within rail receptacle 36, over base 4 as shown in FIG. 6. Outwardly angled section 40 of channel 30 guides bracket 6 over base 4 and complementary shaped tapered edges 24 and 46 of base 4 and channel 30, respectively, cam against one another as bracket 6 is pushed downwardly in the direction of arrows A (FIG. 7). Gap 54 provides clearance between panel 26 and end 52 of rail 2 to allow base 4 and screw heads 22 to pass therethrough as bracket 6 slides downwardly on base 4.

As base 4 passes through bottle-neck section 44 of channel 30, the base applies an outward pressure against elbows 42. Openings 48 formed in legs 28 then allow elbows 42 to flex or deflect outwardly as base 4 slides through channel 30 and the center of curved openings 48 align with elbows 42 allowing elbows 42 to flex inwardly compressing and deforming openings 48 (FIG. 7).

The installer continues to push locking bracket 6 downwardly in the direction of arrow A until base 4 sits within oval-shaped section 38 of channel 30 (FIG. 8). The resiliency of locking bracket 6 allows elbows 42 to snap inwardly and extend partially around the curved oval-shaped end of base 4 retaining base 4 within section 38. Tapered edge 24 of base 4 extends outwardly and operatively interlocks with inwardly tapered chamfered edge 46 of channel 30 to retain locking bracket 6 against fence post 3 and prevent the locking bracket from being pulled outwardly away from its interlocked engagement with base 4.

Figure 10:
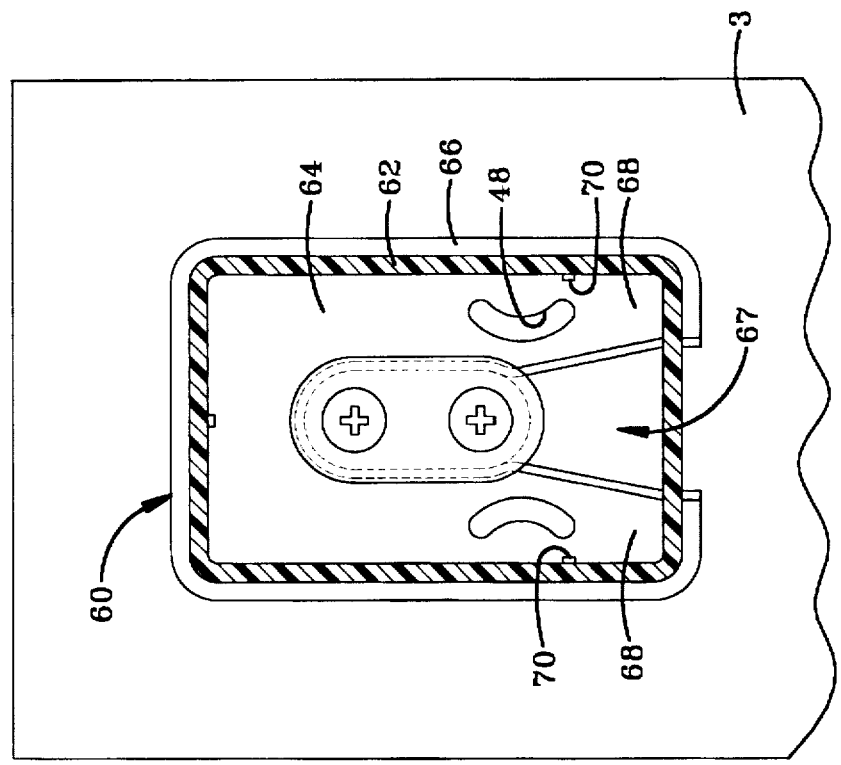
FIG. 10 is an elevational view similar to FIG. 8 showing a second style of locking bracket and fence rail.

A second shape or style of locking bracket is shown in FIG. 10 and is indicated generally at 60. Locking bracket 60 is generally similar in structure and function to locking bracket 6, and has a rectangular-shaped configuration for receiving a rectangular-shaped fence rail 62. Locking bracket 60 includes a rectangular-shaped flat panel 64 with an outwardly extending peripheral wall 66. A snap channel 67, similar to snap channel 30 of bracket 6, is formed in panel 64 and forms spaced legs 68. A pair of tabs 70, which are similar to tabs 51 of bracket 6, extend outwardly from the corner of panel 64 and wall 66 on an outer side edge of each leg 68. Locking bracket 60 operates in the same manner as locking bracket 6 described above.

A second embodiment of the present invention is shown in FIGS. 11-15 and is indicated generally at 80. Clip 80 includes a base, indicated generally at 82 (FIGS. 12-15), and a locking bracket, indicated generally at 84 (FIGS. 12, 14 and 15). Base 82 is generally similar to base 4 of clip 1 and includes an outwardly extending peripheral flange 86 (FIGS. 12 and 13) which forms a rear facing stepped shoulder 88. Stepped shoulder 88 forms a gap 89 between flange 86 and fence post 3 when base 82 is mounted on the fence post (FIG. 15). Locking bracket 84 is generally similar to locking bracket 6 of clip 1 and has a snap channel 90, similar to snap channel 30 described above, with a straight outer edge 92 rather than the chamfered edge 46 of bracket 6.

Locking bracket 84 interlocks with base 82 in a manner similar to that of clip 1 described above. Screws 18 mount base 82 to fence post 3 and one end 52 of fence rail 2 extends into fence rail receptacle 36 of locking bracket 84 with tabs 50 and 51 forming gap 54 between end 52 of fence rail 2 and panel 26 of locking bracket 84. The installer slides bracket 84 over base 82 and edge 92 of channel 90 extends into gap 89 between flange 86 of base 82 and fence post 3. Peripheral wall 32 of bracket 84 extends around fence rail 2 as described above preventing legs 28 of bracket 84 from deflecting outwardly a sufficient distance to allow base 82 to pass through bottle-neck section 44 of channel 90.

Openings 48 of bracket 84 allow base 82 to deflect elbows 42 outwardly as base 82 extends into oval shaped section 38 of channel 90. The resiliency of bracket 84 allows elbows 42 to snap partially around the curved end of base 82 interlocking bracket 84 with base 82. Straight edge 92 of channel 90 sits within gap 89, and flange 86 of base 82 prevents locking bracket 84 from being pulled outwardly away from its interlocked engagement with base 82.

Accordingly, bases 4 and 82 mount to fence post 3 and locking brackets 6, 60 and 84 interlock therewith to perpendicularly attach fence rail 2 to fence post 3. Locking brackets 2, 60 and 84 receive end 52 of fence rail 2 within fence rail receptacle 36 and channels 30 and 90 receive bases 4 and 82, respectively. Slotted openings 48 allow elbows 42 to deflect inwardly as the base of each clip extends through the narrow bottle-neck section 44 of each channel. The clips are molded of a plastic material which is sturdy enough to retain the bases within the oval-shaped sections of the channels yet resilient enough to allow elbows 42 to deflect and flex outwardly. The bases pass through bottle-neck section 44 and elbows 42 snap inwardly partially around the curved end of the bases (FIG. 8) to retain the bases within the channels. Chamfered edge 46 and flange 86 of respective bases prevent the locking brackets from being pulled outwardly away from their interlocked engagement with the bases.

Accordingly, the improved fence rail clip is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved fence rail clip is constructed and used, the characteristics of the construction, and the advantageous, new and useful results obtained; the new and useful structures, devices, elements, arrangements, parts and combinations, are set forth in the appended claims.

I claim:

1. A fence rail clip for attaching a fence rail to a fence post, the fence rail having a longitudinal axis, and a cross-sectional shape substantially perpendicular to the longitudinal axis, said fence rail clip including:

a base having a front surface and a rear surface;

first attachment means for attaching the base to the fence post;

a bracket having a front surface, a rear surface and a fence rail receptacle adapted to be complementarily shaped to the cross-sectional shape of the fence rail formed in the bracket and adapted for receiving an end of the fence rail within the fence rail receptacle;

a peripheral wall extending substantially normal to and outwardly from the bracket, the peripheral wall at least partially defining the fence rail receptacle, the peripheral wall adapted to be complementarily shaped to the fence rail;

second attachment means for attaching the bracket to the base when the fence rail is receiving within the fence rail receptacle;

one of the base and bracket being formed with retaining means for retaining the bracket on the base;

one of the base and bracket being formed with deflecting means for deflecting when the bracket is positioned on the base; and the bracket including the deflecting means, the deflecting means including at least one kidney-shaped opening formed in the bracket.

2. A fence rail clip as defined in claim 1 in which the second attachment means includes an inner peripheral edge formed in the bracket, an outer peripheral edge formed in the base and in which the inner peripheral edge and outer peripheral edge are complementary related.

3. A fence rail clip as defined in claim 2 in which the inner peripheral edge extends around a slot; and in which the slot is sized to receive the base.

4. A fence rail clip as defined in claim 3 in which the rear surface of the base is adapted to be positioned adjacent the fence post; in which the inner peripheral edge of the bracket and outer peripheral edge of the base are adapted to operatively interlock to retain the bracket adjacent the base.

5. A fence rail clip as defined in claim 4 in which the inner peripheral edge of the bracket includes an extended portion; in which the outer peripheral edge of the base includes a recessed portion; and in which the extended portion is complementary shaped with the recess portion.

6. A fence rail clip as defined in claim 5 in which the extended portion slidingly engages the recessed portion when the bracket is slid downwardly over the base.

7. A fence rail clip as defined in claim 6 in which the extended portion of the inner peripheral edge of the bracket includes a taper extending inwardly from the front surface toward the rear surface; in which the recessed portion of the outer peripheral edge of the base includes a taper extending outwardly from the rear surface to the front surface whereby the complementary shaped peripheral edges adapt to engage to retain the bracket adjacent the base.

8. A fence rail clip as defined in claim 6 in which the extended portion of the inner peripheral edge of the bracket includes a flange portion; in which the recessed portion of the outer peripheral edge includes a gap extending adjacent the rear surface of the base; and in which the peripheral edge formed in the bracket is complementary shaped for retaining the bracket adjacent the base.

9. A fence rail clip as defined in claim 3 in which the slot is opened at one end for slidably receiving a base.

10. A fence rail clip as defined in claim 3 in which the slot is formed substantially in the center of the bracket.

11. A fence rail clip as defined in claim 1 in which the first attachment means includes at least one threaded fastener.

12. A fence rail clip as defined in claim 1 in which the bracket includes an inner peripheral edge extending around a slot, at least one kidney-shaped opening is formed within the bracket adjacent the inner peripheral edge whereby the edge may deflect outwardly into the kidney-shaped opening when the bracket is positioned on the base.

13. A fence rail clip as defined in claim 12 in which a portion of the slot is smaller than the base.

14. A fence rail clip as defined in claim 1 in which the portion of the slot that is smaller than the base is disposed adjacent the kidney-shaped opening.

15. A fence rail clip for attaching a fence rail to a fence post, the fence rail having a longitudinal axis and a cross-sectional shape substantially perpendicular to the longitudinal axis, said fence rail clip comprising:

a base having a front surface and a rear surface;

a first connector attaching said base to the fence post;

a locking bracket having a pair of spaced legs defining a channel therebetween;

said channel adapted to slidingly engage said base;

each of said legs having an elbow extending partially into said channel such that said elbows are disposed on either side of said channel;

said channel having a portion disposed between said elbows smaller than said base;

said elbows deflecting outwardly away from said slot when said bracket is positioned on said base; said bracket also having a fence rail receptacle, said fence rail receptacle adapted to be complementarily shaped to the cross-sectional shape of the fence rail and adapted to receive an end of the fence rail thereon; and a second connector attaching said bracket to said base.

16. A fence rail clip as defined in claim 15 further comprising a peripheral wall extending outwardly substantially normal to a substantial portion of the perimeter of said bracket, said peripheral wall at least partially defining said fence rail receptacle.

17. A fence rail clip as defined in claim 15 wherein said bracket has an opening adjacent each of said elbows, each of said elbows deflecting at least partially into an opening when said elbows are deflected.

18. A fence rail clip as defined in claim 17 wherein each of said openings is kidney-shaped having a pair of ends.

19. A fence rail clip as defined in claim 18 wherein said ends of said kidney-shaped openings extend outwardly away from said elbows.

* * * * *